United States Patent [19]

Suzuki et al.

[11] 4,058,090
[45] Nov. 15, 1977

[54] INTERNAL COMBUSTON ENGINE WITH AUXILIARY COMBUSTION CHAMBER

[75] Inventors: Takao Suzuki; Hiroshi Ogita, both of Shizuoka, Japan

[73] Assignee: Toyota Jidosha Kogyo Kabushiki Kaisha, Toyota, Japan

[21] Appl. No.: 559,794

[22] Filed: Mar. 19, 1975

[30] Foreign Application Priority Data

Aug. 8, 1974 Japan .............................. 49-94787[U]

[51] Int. Cl.$^2$ ............................................. F02B 23/00
[52] U.S. Cl. .............................. 123/32 SP; 123/30 C; 123/191 S; 123/193 CP
[58] Field of Search ........... 123/32 SP, 32 ST, 191 S, 123/193 CP, 30 C, 32 K, 32 SA, 191 SP, 193 R, 193 P

[56] References Cited

U.S. PATENT DOCUMENTS

| | | | |
|---|---|---|---|
| 1,605,381 | 11/1926 | Wirrer | 123/191 S |
| 2,065,025 | 12/1936 | Ricardo | 123/30 D |
| 2,466,181 | 4/1949 | Myrick | 123/191 SP |
| 2,735,413 | 2/1956 | Meyer et al. | 123/32 SP |
| 2,753,852 | 7/1956 | Beller | 123/32 SP |
| 2,878,299 | 3/1959 | Starr | 123/32 SP |
| 2,893,360 | 7/1959 | Moller | 123/32 SP |
| 2,914,044 | 11/1959 | Liebel | 123/30 D |
| 3,063,434 | 11/1962 | Haas | 123/32 SP |
| 3,079,901 | 3/1963 | Hallberg | 123/32 SP |
| 3,102,521 | 9/1963 | Slemmons | 123/32 SP |
| 3,113,561 | 12/1963 | Heintz | 123/32 SP |
| 3,154,058 | 10/1964 | Warren | 123/32 SP |
| 3,508,530 | 4/1970 | Clawson | 123/32 SP |
| 3,583,372 | 6/1971 | Hoffmann | 123/30 D |
| 3,738,333 | 6/1973 | Vogelsang | 123/32 SP |

FOREIGN PATENT DOCUMENTS

| | | | |
|---|---|---|---|
| 501,582 | 3/1951 | Belgium | 123/191 SP |

*Primary Examiner*—Ronald H. Lazarus
*Assistant Examiner*—David D. Reynolds
*Attorney, Agent, or Firm*—Stevens, Davis, Miller & Mosher

[57] ABSTRACT

An internal combustion engine of the type in which the combustion space is divided into a main combustion chamber and an auxiliary combustion chamber connected to each other by a communication passage, and an ignition plug and a fuel injection nozzle are provided for the auxiliary combustion chamber so that the flame produced by the ignition and combustion of a arch fuel-air mixture in the auxiliary combustion chamber spreads into the main combustion chamber to cause effective secondary combustion in the main combustion chamber, and the upper surface of a crown of the piston has a conical configuration of which the apex is located to be brought to a position adjacent to the center of the opening of the communication passage opened to the main combustion chamber when the piston reaches the upper dead point in the compression stroke thereof, and the crown has a bank formed on the peripheral edge of the crown.

7 Claims, 2 Drawing Figures

INTERNAL COMBUSTON ENGINE WITH AUXILIARY COMBUSTION CHAMBER

BACKGROUND OF THE INVENTION

This invention relates to an internal combustion engine of the type provided with an auxiliary combustion chamber in addition to a main combustion chamber, and more particularly to a gasoline injection internal combustion engine of the above type for atuomotive vehicles which can operate with an improved rate of fuel consumption, while, at the same time, attaining the desired purification of exhaust gases.

In an internal combustion engine of the type provided with an auxiliary combustion chamber in addition to a main cumbustion chamber, fuel is injected directly into the auxiliary combustion chamber to produce a rich fule-air mixture in the auxiliary combustion chamber, and a portion of the fuel is supplied from the auxiliary combustion chamber into the main combustion chamber so as to produce a lean fuel-air mixture in the main combustion chamber and attain the so-called stratified charge combustion in which the fuel is subjected to primary and secondary combustion. While this stratified charge combustion is avantageous in reducing the amount of nitrogen oxides ($NO_x$) among harmful components of engine exhaust gases, it has the disadvantage of increasing the amounts of non-burnt hydrocarbons (HC) and carbon monoxide (C0) due to the fact that the rich fuel-air mixture is produced and ignited in the auxiliary combustion chamber.

An internal combustion engine is known in which the combustion space is divided into a main combustion chamber and an auxiliary combustion chamber, and an intake valve and an exhaust valve are provided for the main combustion chamber. In this engine, the main combustion chamber is connected to the auxiliary combustion chamber by a communication passage, and an ignition plug and a fuel injection nozzle are provided for the auxiliary combustion chamber, so that a rich fuel-air mixture in the auxiliary combustion chamber is initially ignited and the flame thus produced can be utilized for causing secondary combustion of the fuel-air mixture in the main combustion chamber. In such an engine, air must be supplied from the main combustion chamber into the auxiliary combustion chamber so as to produce a swirl in the auxiliary combustion chamber and the flame produced in the auxiliary combustion chamber must quickly spread throughout the main combustion chamber to ensure effective secondary combustion of the fuel-air mixture in the main combustion chamber.

SUMMARY OF THE INVENTION

It is therefore a primary object of the present invention to provide an internal combustion engine of the type above described which is uniquely designed to meet the above demand and which has the ability to discharge satisfactorily purified exhaust gases and can operate with an improved rate of fuel consumption.

In accordance with the present invention, there is provided an internal combustion engine comprising a main combustion chamber defined by the inner surface of a cylinder bore, the upper surface of a piston head disposed in the cylinder bore for reciprocating movement therein and the under surface of a cylinder head, an auxiliary combustion chamber formed in the cylinder head at a position above the main combustion chamber and having an ignition plug and a fuel injection nozzle associated therewith, and a communication passage for providing communication between the main and auxiliary combustion chambers, wherein the piston head has a crown of a generally conical configuration of which the apex is located to be brought to a position adjacent to the center of the opening of the communication passage adjacent to the main combustion chamber when said piston reaches the upper dead center in the compression stroke thereof and a bank is formed to extend from the peripheral edge of the head end of said piston.

DESCRIPTION OF THE PREFERRED EMBODIMENT

Figures 1, 2:
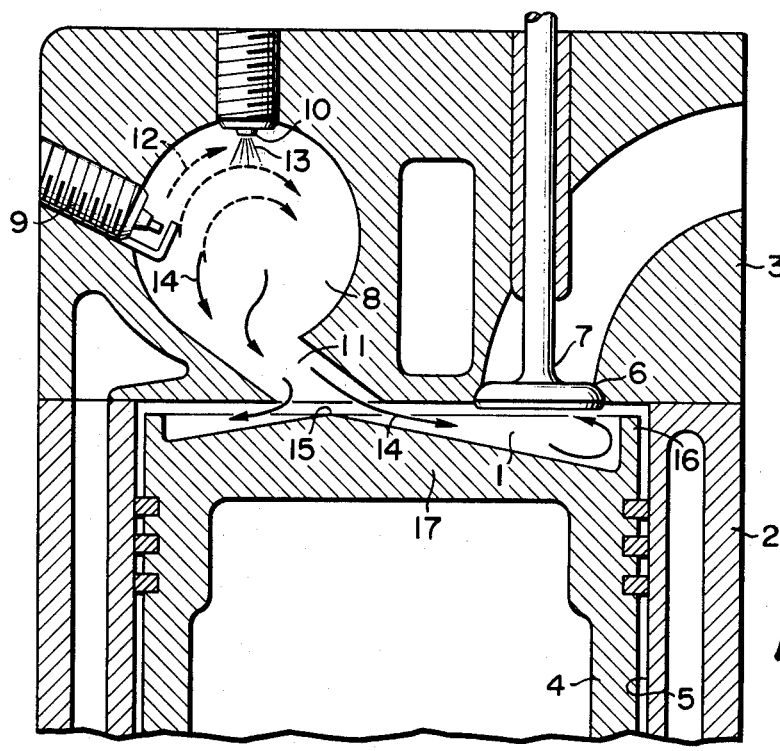
FIG. 1 is a longitudinal sectional view of a part of an embodiment of the internal combustion engine according to the present invention and shows the state in which the piston reaches the upper dead center piston in its compression stroke.
FIG. 2 is a graphic representation of the relation between the air-fuel ratio and the amounts of harmful exhaust gas components in the engine of the present invention compared with the similar relation in a prior art engine of this type.

Referring to FIG. 1 showing an embodiment of the gasoline injection internal combustion engine according to the present invenion in longitudinal section, a main combustion chamber 1 is formed between one end of a cylinder block 2 of the engine on which the cylinder head 3 is secured. A piston 4 is disposed in a cylinder bore 5 of the cylinder block 2 and is receprocable therein. For simplification, only one cylinder of the engine is illustrated. It will be clear, however, that any number of cylinders can be provided so long as they are constructed in the manner to be described.

The cylinder head 3 is rigidly secured to the cylinder block 2 by means of conventional means, such as bolts and the like (not shown) in usual manner. The piston 4 is adapted to reciprocate vertically in a cylinder bore 5 and is connected to an engine crankshaft (not shown) by any suitable means. The cylinder head 3 is provided with an intake port 6 and an exhaust port (not shown) the same as a usual engine of this type which are openable and closable by an intake valve 7 and an exhaust valve (not shown) respectively for communication with the main combustion chamber 1. An auxiliary combustion chamber 8 of a spherical shape is formed in the cylinder head 3 at a position above the main combustion chamber 1. The shape of the auxiliary combustion chamber may be cylindrical or oval. A spark plug 9 and a fuel injection nozzle 10 are associated with this auxiliary combustion chamber 8 as shown in FIG. 1. The spark plug 9 and the fuel injection nozzle 10 are of conventional types which are well known in the technical field of the internal combustion engines. The auxiliary combustion chamber 8 communicates with the main combustion chamber 1 through a communication passage 11 formed in the cylinder head 3.

The volume of the auxiliary combustion chamber 8 is desirably as large as possible, but this volume is preferably limited to about 90% of the volume of the combustion space at the maximum in view of the structural demand that a suitable space must be present between the cylinder head 3 and the crown 17 of the piston 4 even in the uppermost position of the piston 4 and that a certain volume is required for the communication passage 11. The auxiliary combustion chamber 8 is configured to have a substantially hollow spherical, hollow cylindrical or any other suitable shape so that a swirl 12 can be produced in the stream of air flowing into the auxiliary combustion chamber 8 from the intake port 6 via the main combustion chamber 1 and communication passage 11 is inclined in a direction which is effective in producing such swirling stream 12. The sectional area of the communication passage 11 is selected to be 1 to 10% of the sectional area of the cylinder bore 5 so as to minimize an undesirable loss due to restriction against air flow, and at the same time, to prevent fuel 13 injected into the auxiliary combustion chamber 8 from passing immediately into the main combustion chamber 1. The axis of the communication passage 11 is inclined to make a large angle with the axis of the cylinder bore 5 so that the flow of burning gases 14 emerging from the auxiliary combustion chamber 8 may not impinge violently against the upper surface of the crown 17 of the piston 4 and such burning gas flow 14 can spread rapidly throughout the main combustion chamber 1. The spark plug 9 is disposed at a position at which the swirling stream 12 is produced in the auxiliary combustion chamber 8 is not substantially affected.

The crown 17 of the piston 4 has an annular flange or bank 16 projected from the peripheral edge of the crown 17 in the axial direction of the piston 4. The apex 15 of the conical crown 17 of the piston 4 is located to be brought to a position adjacent to the center of the opening of the communication passage 11 adjacent the main combustion chamber 1 when the piston 4 reaches the upper dead center portion in its compression stroke. It is preferable that the position of the apex 15 is as nearly to the center point of the crown 17 as possible and the level of the apex 15 is the same as that of the upper end of the bank 16.

In the suction stroke of the piston 4, air is solely drawn into the cylinder bore 5 through the port 6. The fuel is injected by the fuel injection nozzle 10 into the auxiliary combustion chamber 8 as shown by 13 when the intake valve 7 is closed during the compression stroke of the engine. The fuel-air mixture is ignited to initiate combustion in the auxiliary combustion chamber 8. The burning gas flow 14 jetted into the main combustion chamber 1 from the auxiliary combustion chamber 8 impinges against the conical upper surface of the crown 17 of the piston 4 and is guided along the conical upper surface to spread immediately throughout the main combustion chamber 1. Thus, the burning gas flow 14 can be satisfactorily mixed with air in the main combustion chamber 1, thereby improving the rate of secondary combustion. The bank 16 formed on the peripheral edge of the crown 17 of the piston 4 prevents undesirable leakage of the burning gases into the gap between the inner wall of the cylinder bore 5 and the outer peripheral wall of the piston 4 and deflects the burning gas flowing to the upper corner portion of the main combustion chamber along the conical upper surface of the crown 17 and causes the burning gas to mix with the air residing at the corner portion, thereby the secondary combustion is improved.

FIG. 2 is a graphic representation of the relationship between the air-fuel ratio and the amounts of harmful exhaust gas components in the engine of the present invention in comparison with the similar relation in a conventional engine of the type having the auxiliary combustion chamber. The curves A and B represent the results obtained with the engine of the present invention and the conventional engine respectively, and it is readily apparent that the engine of the present invention is superior to the prior art engine in the exhaust gas purification performance.

It will be understood from the foregoing description of the present invention that the flame of the burning fuel-air mixture can satisfactorily spread throughout the main combustion chamber to sustain the secondary combustion of the fuel-air mixture in the main combustion chamber. Therefore, the present invention is advantageous in that objectionable discharge of $NO_x$ from the engine can be reduced to a minimum and the amounts of HC and CO in the engine gases can also be reduced. The present invention provides such an additional advantage that the amounts of combustion products including carbon depositing on the piston can be considerably reduced.

While the invention has been illustrated in its preferred embodiment, it will be clear those skilled in the arts to which the invention pertains that many modifications and changes can be made thereto without departing from the scope of the invention.

What is claimed is:

1. An internal combustion engine comprising:
    a cylinder;
    a cylinder head secured to said cylinder;
    a piston reciprocably disposed in said cylinder and having a crown at one end thereof which faces said cylinder head, said crown being substantially conical with the conical substantially straight side thereof sloping from the apex thereof in a direction away from said cylinder head, said piston further comprising a straight annular bank on the peripheral edge of said crown, said bank extending from the peripheral edge of the crown toward said cylinder head in a direction parallel to the axis of said piston;
    a main combustion chamber defined by said cylinder, said cylinder head, and the crown of said piston;
    means defining an auxiliary combustion chamber or circular cross-section in said cylinder head;
    a spark plug in said auxiliary combustion chamber;
    means for supplying fuel to said auxiliary combustion chamber;
    means defining a communication passage in said cylinder head fluidly communicating said main combustion chamber and said auxiliary combustion chamber, said communication passage being disposed tangentially to the periphery of the auxiliary combustion chamber, the axis of said communication passage being inclined at an angle to the axis of said cylinder, one end of said passage terminating in a first opening which opens into said main combustion chamber and the other end thereof terminating in a second opening which opens into said auxiliary combustion chamber;
    the apex of the piston crown lies on a straight line which is parallel to the axis of the piston and intersects the axis of the passage at said first opening so that the apex is adjacent the first opening when the piston is in its top dead center position whereby burning gas in the auxiliary combustion chamber jets therefrom into the main combustion chamber and is guided along the crown of the piston so as to spread throughout the main combustion chamber.

2. An internal combustion engine according to claim 1, wherein said apex is at the same level as that of the upper end of said bank.

3. An internal combustion engine according to claim 1, wherein said fuel supplying means comprises a fuel injection nozzle in said auxiliary combustion chamber.

4. An internal combustion engine according to claim 1, wherein said spark plug has electrodes in said auxiliary combustion chamber.

5. An internal combustion engine according to claim 3, wherein said fuel injection nozzle injects the fuel in a direction toward the center of the auxiliary combustion chamber.

6. An internal combustion engine according to claim 1, wherein said apex is eccentrically disposed relative to the axis of said cylinder.

7. An internal combustion engine comprising:
a cylinder;
a cylinder head secured to said cylinder;
a piston reciprocably disposed in said cylinder and having a crown at one end thereof which faces said cylinder head, said crown being substantially conical with the apex thereof being radially spaced from the axis of the cylinder and the conical substantially straight side sloping from the apex in a direction away from the cylinder head, said piston further comprising an annular straight flange on the peripheral edge of said crown, said flange extending from the peripheral edge of the crown toward said cylinder head in a direction parallel to the axis of said piston and terminating in an edge which lies in the same plane, perpendicular to the axis of said piston, as said apex;
a main combustion chamber defined by said cylinder, said cylinder head, and the crown of said piston;
means defining an auxiliary combustion chamber of circular cross-section in said cylinder head;
a spark plug in said auxiliary combustion chamber;
means for supplying fuel to said auxiliary combustion chamber;
means defining a communication passage in said cylinder head fluidly communicating said main combustion chamber and said auxiliary combustion chamber, said communication passage being disposed tangentially to the periphery of the auxiliary combustion chamber, one end of said passage terminating in a first opening which opens into said main combustion chamber and the other end thereof terminating in a second opening which opens into said auxiliary combustion chamber; and
the center of said first opening and said apex both lie substantially on the same straight line which is parallel to the axis of the piston whereby fuel initially combusted in the auxiliary combustion chamber jets therefrom into the main combustion chamber and is guided along the crown of the piston so as to spread throughout the main combustion chamber and the flange prevents leakage of the burning fuel between the piston and the cylinder and deflects and mixes the burning fuel to thereby improve secondary combustion.

* * * * *